United States Patent [19]
Bunker

[11] Patent Number: 5,551,661
[45] Date of Patent: Sep. 3, 1996

[54] AUTOMOTIVE TRANSMISSION MOUNT

[76] Inventor: Donald D. Bunker, 28182 Palmada, Mission Viejo, Calif. 92692

[21] Appl. No.: 322,091

[22] Filed: Oct. 11, 1994

[51] Int. Cl.⁶ .................................................. F16M 13/00
[52] U.S. Cl. ......................... 248/634; 248/638; 267/141; 267/153
[58] Field of Search ..................... 248/634, 635, 248/638, 674, 222.3; 180/299, 300, 312, 377; 267/141, 153; 403/220, 221

[56] References Cited

U.S. PATENT DOCUMENTS

| | | | |
|---|---|---|---|
| 1,844,755 | 2/1932 | Geyer et al. | 248/634 |
| 1,930,310 | 10/1933 | Geyer | 248/635 |
| 2,138,176 | 11/1938 | Keys | 248/635 X |
| 2,308,962 | 1/1943 | Riesing | 248/635 X |
| 5,031,873 | 7/1991 | Rau | 248/634 X |
| 5,215,382 | 6/1993 | Kemeny | 248/634 X |
| 5,251,865 | 10/1993 | Kelly . | |
| 5,295,671 | 3/1994 | Nakagaki et al. | 248/638 X |

FOREIGN PATENT DOCUMENTS

| 468165 | 6/1937 | United Kingdom | 248/634 |
|---|---|---|---|
| 672578 | 5/1952 | United Kingdom | 248/634 |

*Primary Examiner*—Alvin C. Chin-Shue
*Assistant Examiner*—Derek J. Berger
*Attorney, Agent, or Firm*—Stetina Brunda & Buyan

[57] ABSTRACT

An automotive transmission mount has a top plate configured for attachment to a transmission housing, the top plate having a downwardly bent portion, the downwardly bent portion having a window formed therein; and also has a bottom plate configured for attachment to the cross-arm of a vehicle frame. The bottom plate has an upwardly extending portion having a flange formed thereon, the upwardly extending portion being received within the window of the downwardly bent portion such that the flange is captured by the downwardly bent portion. The top plate and the bottom plate thus interlock such that in the event of failure, the top plate and the bottom plate do not separate from one another. Polyurethane is molded intermediate the top plate and the bottom plate. An optional cover plate applies a preload to the polyurethane. The preload mitigates the need for adhesive bonding of the polyurethane to the top and bottom plates.

15 Claims, 1 Drawing Sheet

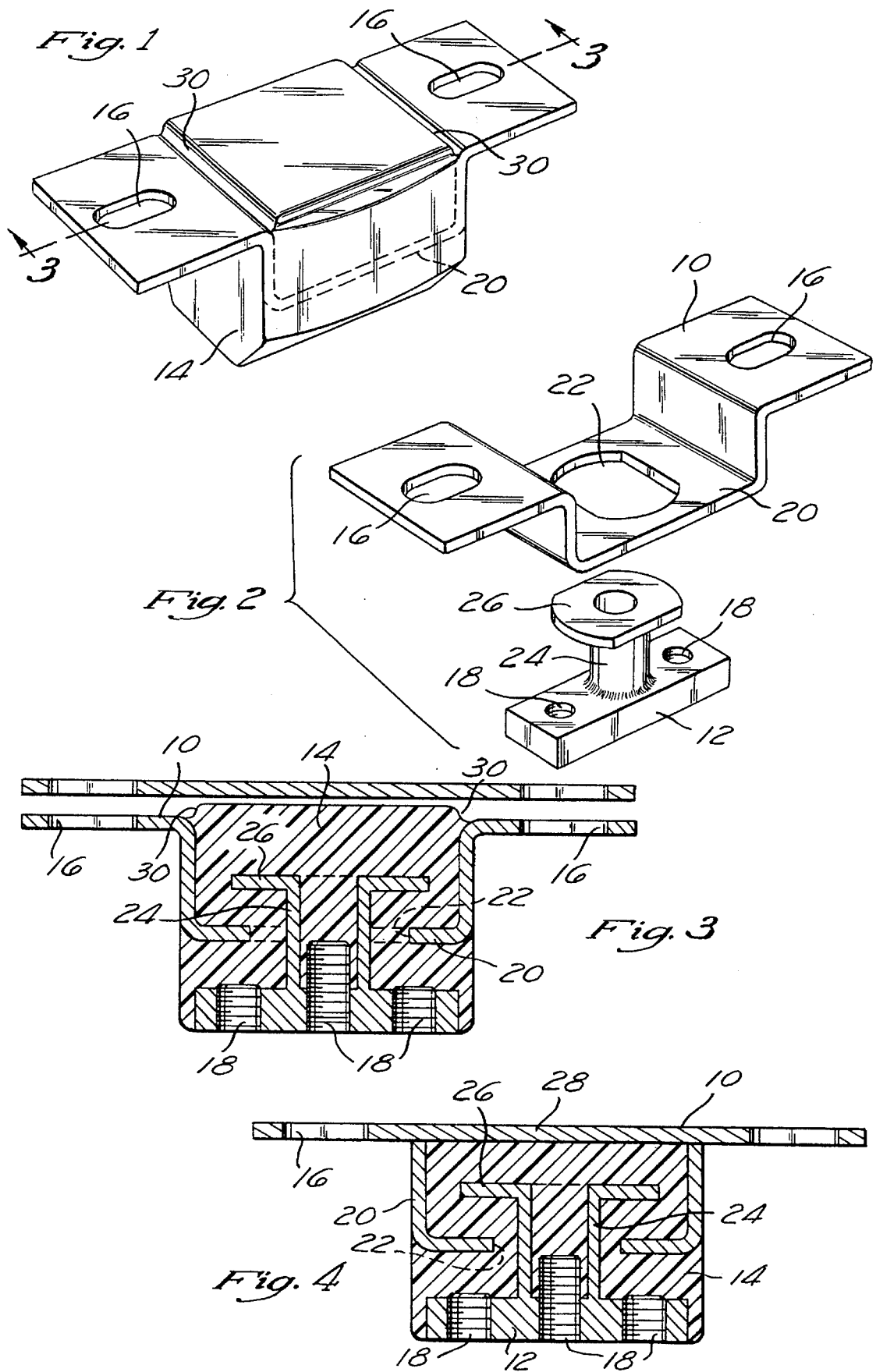

5,551,661

AUTOMOTIVE TRANSMISSION MOUNT

FIELD OF THE INVENTION

The present invention relates generally to mounting devices and more particularly to an automotive transmission mount having interlocking top and bottom plates with polyurethane disposed therebetween.

BACKGROUND OF THE INVENTION

Automotive transmissions are normally installed in trucks and automobiles by mounting them on a cross-arm attached to the frame of the vehicle. A transmission mount, normally consisting of two horizontal metal plates attached together via a rubber-filled core, is inserted between the bottom of the transmission housing and the top of the cross-arm to provide support and shock-absorption for the transmission. In most vehicles the top plate of the mount is secured to the bottom of the transmission's housing by means of two perforations properly spaced apart and sized to receive corresponding studs or bolts protruding down from the transmission. Similarly, the bottom plate of the mount features one, two, or three studs or threaded holes designed to match corresponding apertures or bolts, respectively, in the top of the cross-arm.

Thus, the mount is first fastened to the top of the cross-arm by securing its bottom plate thereto; the transmission is then installed on top of the mount and secured to the top plate thereof, as well as to other parts of the vehicle and of the drive-train. Once so assembled, the transmission is firmly braced to and supported by the cross-arm through the rubber mount so installed, which also provides shock absorption to alleviate the effects of vibration during the operation of the vehicle.

One example of such a contemporary automotive transmission mount is disclosed in U.S. Pat. No. 5,251,865, issued to Kelly on Oct. 12, 1993. The Kelly patent discloses a transmission mount having a rubber core disposed intermediate a top plate configured for attachment to the transmission housing and a bottom plate configured for attachment to the supporting cross-arm of the vehicle frame.

Although such contemporary automotive transmission mounts have proven generally suitable for their intended purposes, they possess inherent deficiencies which detract from their overall effectiveness in the marketplace. One example of such an inherent deficiency is readily apparent in the Kelly device, wherein the upper and lower plates thereof do not interlock. Thus, deterioration and/or debonding of the resilient material disposed therebetween can result in complete detachment of the upper plate from the lower plate, thereby rendering the Kelly automotive transmission mount ineffective.

Additionally, the Kelly automotive transmission mount, as is typical of contemporary automotive transmission mounts, utilizes rubber as the resilient material thereof. As is well known to those skilled in the art, rubber is susceptible to degradation due to various environmental factors, such as contamination by various automotive fluids, e.g., gasoline, oil, transmission fluid, brake fluid, etc., as well as ozone and other atmospheric pollutants.

As such, although the prior art has recognized to a limited extent the problem of bracing and supporting automotive transmissions to the frame cross-arm of a vehicle, the proposed solutions have, to date, been ineffective in providing a satisfactory remedy.

SUMMARY OF THE INVENTION

The present invention specifically addresses and alleviates the above-mentioned deficiencies associated with the prior art. More particularly, the present invention comprises an automotive transmission mount comprising a top plate configured for attachment to a transmission housing and having a downwardly bent portion, the downwardly bent portion having a window formed therein; and also comprising a bottom plate configured for attachment to the cross-arm of a vehicle frame. The bottom plate has an upwardly extending portion having a flange formed thereon, the upwardly extending portion being received within the window of the downwardly bent portion such that the flange is captured by the downwardly bent portion. A resilient material, i.e., polyurethane, is molded intermediate the top and the bottom plates. The top and bottom plates are preferably comprised of steel, although those skilled in the art will recognize that various other materials are likewise suitable.

Thus, the top and the bottom plates interlock such that in the event of failure of the resilient material, the top and the bottom plates do not separate from one another, thereby allowing the automotive transmission mount of the present invention to function even in the event of such failure.

Further, the polyurethane disposed intermediate the top and the bottom plates is highly resistant to degradation caused by environmental factors such as contamination via gas, oil, transmission fluid, brake fluid, power steering fluid, etc.

According to the methodology of the present invention, the automotive transmission mount is manufactured by placing interlocked top and bottom plates into a mold as first and second inserts and then injecting polyurethane into the mold. Thus, the top and bottom plates are configured so as to be locked together prior to injection molding of the polyurethane therearound.

A first embodiment of the automotive transmission mount of the present invention further comprises a cover plate configured so as to be disposed intermediate the top plate and the transmission in a manner which effects compression of the polyurethane. Such compression of the polyurethane applies a preload thereto, so as to mitigate the need for adhesive bonding of the polyurethane to the top and bottom plates.

In a second embodiment of the automotive transmission mount of the present invention, the polyurethane is adhesively bonded to the top and bottom plates thereof, and no preload is provided. Of course, both a preload and adhesive bonding may be utilized, if desired.

These, as well as other advantages of the present invention will be more apparent from the following description and drawings. It is understood that changes in the specific structure shown and described may be made within the scope of the claims without departing from the spirit of the invention.

BRIEF DESCRIPTION OF THE DRAWINGS

FIG. 1 is a perspective view of a first embodiment of the automotive transmission mount of the present invention;

FIG. 2 is a perspective view of the automotive transmission mount of FIG. 1 showing the upper and lower plates thereof exploded away from one another and having the resilient material removed therefrom for clarity;

FIG. 3 is a cross-sectional side view taken along lines 3 of FIG. 1 and also showing an optional top cover for compressing the polyurethane so as to apply a preload thereto; and FIG. 4 is a cross-sectional side view similar to that of FIG. 3, showing a second embodiment of the automotive transmission mount of the present invention.

DETAILED DESCRIPTION OF THE PREFERRED EMBODIMENT

The detailed discussion set forth below in connection with the appended drawings is intended as a description of the presently preferred embodiments of the invention, and is not intended to represent the only forms in which the present invention may be constructed or utilized. The description sets forth the functions and sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

The automotive transmission mount of the present invention is illustrated in FIGS. 1–4, which depict two presently preferred embodiments of the invention. Referring now to FIGS. 1–3, the first embodiment of the automotive transmission mount of the present invention is comprised generally of a top plate 10 configured for attachment to a transmission housing, and a bottom plate 12 configured for attachment to a vehicle frame, preferably the cross-arm thereof. As best shown in FIG. 3, the bottom plate 12 interlocks with the top plate 10 to prevent separation of the bottom plate 12 from the top plate 10. This interlocking occurs as a result of flange 26 of the bottom plate 12 being received within window 22 of the top plate 10, as discussed in detail below. A resilient material 14 is disposed intermediate the top plate 10 and the bottom plate 12.

The resilient material preferably comprises polyurethane so as to resist degradation due to soiling, environmental contamination, and exposure to automotive fluids, particularly petroleum products such as gasoline, oil, transmission fluid, brake fluid, power steering fluid, etc.

The top plate 10 comprises slotted apertures 16 so as to facilitate mounting to the transmission housing (not shown) and the bottom plate 12 comprises threaded apertures 18 to similarly facilitate attachment to the vehicle cross member/frame (not shown). Three threaded apertures 18 are preferably formed in the lower plate 12 in a linear fashion.

The resilient polyurethane material 14 preferably comprises an upwardly extending portion 30 which raises above the top plate 10 and which is compressed by optional cover plate 11 during installation of the automotive transmission mount of the present invention, as the top plate 10 is attached to the transmission housing.

Thus, the cover plate 11 facilitates the application of a preload to the polyurethane 14 by compressing the polyurethane 14 during installation of the automotive transmission mount. Slotted apertures 17 formed in the cover plate 11, which are complementary to slotted apertures 16 formed in the top plate 10, allow bolts to pass through both the top plate 10 and the cover plate 11 such that when the bolts are tightened, they draw the top plate 10 toward the transmission. As the bolts are tightened, the cover plate 11 is also simultaneously drawn toward the top plate 10, thereby compressing the polyurethane 14 so as to apply such a preload. The preload mitigates the need for adhesive bonding of the polyurethane to the top 10 and bottom 12 plates.

Thus, in the first embodiment of the present invention, the polyurethane 14 is preferably not bonded to the top 10 and bottom 12 plates.

The top plate 10 preferably comprises a downwardly bent portion 20 having an oblong window 22 formed therein. The bottom plate 12 preferably comprises an upwardly extending portion 24 having a corresponding oblong flange 26 formed thereon. The oblong window 22 and the oblong flange 26 are preferably offset with respect to one another, preferably at approximately 90°, such that the oblong flange 26 must be rotated so as to facilitate insertion thereof into the oblong window 22. After such insertion, the oblong flange 26 is rotated into a position which facilitates use thereof and which also prevents separation of the top 10 and bottom 12 plates.

The upwardly extending portion 24 is thus received within the window 22 such that the flange 26 is captured by the downwardly bent portion 20 of the top plate 10. As such, the top plate 10 is interlocked with the bottom plate 12 such that failure of the resilient polyurethane material 14 does not result in separation of the top plate 10 and the bottom plate 12, thereby substantially increasing the reliability of the automotive transmission mount of the present invention.

The window 22 and the flange 26 preferably have complimentary shapes. In the preferred embodiment of the present invention, the window 22 and the flange 26 are formed by defining a circle having two flat sides, i.e., cords of the circle, formed thereon, so as to define an oblong shape.

The automotive transmission mount of the present invention is preferably formed according to the steps of: placing first and second inserts into a mold, the first insert comprising the top plate 10 and the second insert comprising the bottom plate 12; injecting polyurethane into the mold; and cooling the polyurethane.

Referring now to FIG. 4, in a second embodiment of the present invention the top plate 10 comprises a bridge portion 28 extending in a common plane to and intermediate the apertures 16 so as to provide additional structural strength to the automotive transmission mount.

Since no preload is applied to the polyurethane in the second embodiment of the automotive transmission mount of the present invention, the polyurethane is preferably adhesively bonded to the top plate 10 and bottom plate 12. Preferably, the polyurethane 14 is adhesively bonded to each surface of the top plate 10 and bottom plate 12 which is contacted thereby, including the upwardly extending portion 24, the flange 26, and the downwardly bent portion 20. Those skilled in the art will recognize that a number of different adhesive bonding agents are suitable.

It is understood that the exemplary automotive transmission mount described herein and shown in the drawings represents only two presently preferred embodiments of the invention. Indeed, various modifications and additions may be made to such embodiments without departing from the spirit and scope of the invention. For example, various configurations of the top and bottom plates are contemplated. Also, those skilled in the art will recognize that various different configurations of the slotted apertures and threaded apertures are suitable for applications with various different transmissions and automobiles. Thus, these and other modifications may be obvious to those skilled in the art and may be implemented to adapt the present invention for use in a variety of different applications.

What is claimed is:

1. An automotive transmission mount comprising:

a) a top plate configured for attachment to a transmission housing and defining top and bottom surfaces;

b) a bottom plate configured for attachment to a vehicle frame, the bottom plate being interlocked with the top plate to prevent separation of the bottom plate from the top plate; and c) a resilient material disposed between said top plate and said bottom plate and including an upwardly extending portion which protrudes beyond the top surface of the top plate.

2. The automotive transmission mount as recited in claim 1 wherein said resilient material comprises polyurethane.

3. The automotive transmission mount as recited in claim 1 further comprising a cover plate configured to compress the upwardly extending portion of said resilient material so as to apply a preload to said bottom plate.

4. The automotive transmission mount as recited in claim 1 wherein:

a) said top plate comprises a downwardly bent portion defining the bottom surface and having a window formed therein;

b) said bottom plate comprises an upwardly extending portion having a flange formed thereon; and c) said upwardly extending portion is received within said window such that said flange is captured by the downwardly bent portion of said top plate.

5. The automotive transmission mount as recited in claim 4 wherein:

a) the downwardly bent portion of the top plate has an oblong window formed therein;

b) the upwardly extending portion of the bottom plate has an oblong flange formed thereon which is complimentary to the oblong window and sized to be extensible therethrough; and c) the oblong flange is extended through the oblong window and angularly offset relative thereto in a manner facilitating the capture of the flange by the downwardly bent portion of the top plate.

6. The automotive transmission mount as recited in claim 4 further comprising a cover plate for compressing the upwardly extending portion of the resilient material so as to apply a preload to the flange of the bottom plate.

7. The automotive transmission mount as recited in claim 1 wherein said resilient material is adhesively bonded to said top plate and said bottom plate.

8. The automotive transmission mount as recited in claim 1 wherein the top plate includes an oblong window formed therein and the bottom plate includes an oblong flange formed thereon which is extended through the oblong window and angularly offset relative thereto so as to interlock said top plate and said bottom plate.

9. An automotive transmission mount comprising:

a) a top plate configured for attachment to a transmission housing and defining top and bottom surfaces;

b) a bottom plate configured for attachment to a vehicle frame; and c) polyurethane molded between said top plate and said bottom plate and including an upwardly extending portion which protrudes beyond the top surface of the top plate.

10. The automotive transmission mount as recited in claim 9 wherein said top plate and said bottom plate are configured to interlock with one another.

11. The automotive transmission mount as recited in claim 10 wherein:

a) said top plate comprises a downwardly bent portion defining the bottom surface and having a window formed therein;

b) said bottom plate comprises an upwardly extending portion having a flange formed thereon; and c) said upwardly extending portion is received within the window such that said flange is captured by the downwardly bent portion of said top plate.

12. The automotive transmission mount as recited in claim 11 wherein:

a) the downwardly bent portion of the top plate has an oblong window formed therein;

b) the upwardly extending portion of the bottom plate has an oblong flange formed thereon which is complimentary to the oblong window and sized to be extensible therethrough; and c) the oblong flange is extended through the oblong window and angularly offset relative thereto in a manner facilitating the capture of the flange by the downwardly bent portion of the top plate.

13. The automotive transmission mount as recited in claim 11 further comprising a cover plate for compressing the upwardly extending portion of the polyurethane so as to apply a preload to the flange of the bottom plate.

14. The automotive transmission mount as recited in claim 9 wherein said top plate includes an oblong window formed therein and said bottom plate includes an oblong flange formed thereon which is extended through said oblong window and angularly offset relative thereto so as to interlock said top plate and said bottom plate.

15. The automotive transmission mount as recited in claim 9 further comprising a cover plate for compressing the upwardly extending portion of said polyurethane so as to apply a preload to said bottom plate.

* * * * *